United States Patent
Ropke et al.

(10) Patent No.: US 11,470,364 B2
(45) Date of Patent: *Oct. 11, 2022

(54) USE OF STEGANOGRAPHICALLY-ENCODED TIME INFORMATION AS BASIS TO ESTABLISH A TIME OFFSET, TO FACILITATE TAKING CONTENT-RELATED ACTION

(71) Applicant: The Nielsen Company (US), LLC, New York, NY (US)

(72) Inventors: Benjamin J. Ropke, Rochelle, NY (US); John S. Stavropoulos, Edison, NJ (US); Shashank C. Merchant, Sunnyvale, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,843

(22) Filed: May 13, 2021

(65) Prior Publication Data
US 2021/0266617 A1 Aug. 26, 2021

Related U.S. Application Data

(63) Continuation of application No. 15/929,220, filed on Feb. 6, 2020, now Pat. No. 11,051,057.
(Continued)

(51) Int. Cl.
*H04N 7/10* (2006.01)
*H04N 21/234* (2011.01)
(Continued)

(52) U.S. Cl.
CPC ..... *H04N 21/23424* (2013.01); *G06T 1/0085* (2013.01); *H04N 21/23892* (2013.01);
(Continued)

(58) Field of Classification Search
CPC ....... H04N 21/23424; H04N 21/23892; H04N 21/44008; H04N 21/44016; H04N 21/812;
(Continued)

(56) References Cited

U.S. PATENT DOCUMENTS

| | | | | |
|---|---|---|---|---|
| 6,570,996 B1* | 5/2003 | Linnartz | ............ | H04N 1/00037 725/20 |
| 6,889,325 B1* | 5/2005 | Sipman | ................. | H04L 63/126 380/37 |
| 8,290,423 B2* | 10/2012 | Wang | ..................... | H04H 60/63 455/2.01 |
| 2002/0072982 A1* | 6/2002 | Barton | ............... | G06Q 30/0625 705/14.1 |
| 2002/0083060 A1* | 6/2002 | Wang | ..................... | G11B 27/28 |
| 2004/0199387 A1* | 10/2004 | Wang | ..................... | G06Q 30/06 704/E15.045 |

(Continued)

OTHER PUBLICATIONS

International Search Report and Written Opinion from International Application No. PCT/US2020/037925, dated Sep. 25, 2020.
(Continued)

*Primary Examiner* — Michael B. Pierorazio
(74) *Attorney, Agent, or Firm* — McDonnell Boehnen Hulbert & Berghoff LLP

(57) ABSTRACT

A method and system for using steganographically-encoded time information as a basis to control when a client carries out a content-related action. The client processes for presentation one or more linear media streams, each defining a respective time sequence of frames of media content, and at least one of the streams being steganographically encoded with at least one watermark at a respective time-point within the linear media stream, the watermark encoding a timestamp of the respective time-point within the linear media stream according to a server clock. The client extracts the timestamp from the watermark and computes a time offset based on a difference between the extracted timestamp and a current time according to a client clock. And the client uses the computed time offset as a basis to determine when the client should carry out a content-related action in a given one of the one or more linear media streams.

20 Claims, 7 Drawing Sheets

Related U.S. Application Data

(60) Provisional application No. 62/865,607, filed on Jun. 24, 2019.

(51) Int. Cl.

| | |
|---|---|
| *H04N 21/44* | (2011.01) |
| *H04N 21/845* | (2011.01) |
| *H04N 21/8358* | (2011.01) |
| *G06T 1/00* | (2006.01) |
| *H04N 21/2389* | (2011.01) |
| *H04N 21/81* | (2011.01) |
| *H04N 21/8547* | (2011.01) |

(52) U.S. Cl.
CPC . H04N 21/44008 (2013.01); H04N 21/44016 (2013.01); H04N 21/812 (2013.01); H04N 21/8358 (2013.01); H04N 21/8456 (2013.01); H04N 21/8547 (2013.01)

(58) Field of Classification Search
CPC ........... H04N 21/8358; H04N 21/8456; H04N 21/8547; H04N 21/234; G06T 1/0085
See application file for complete search history.

(56) References Cited

U.S. PATENT DOCUMENTS

| | | | | |
|---|---|---|---|---|
| 2005/0028195 | A1* | 2/2005 | Feinleib | H04N 21/812 725/135 |
| 2005/0091274 | A1* | 4/2005 | Stanford | G06F 16/9577 |
| 2005/0192863 | A1* | 9/2005 | Mohan | G06Q 30/02 705/14.27 |
| 2005/0209917 | A1* | 9/2005 | Anderson | G06Q 30/0214 705/14.16 |
| 2006/0195359 | A1* | 8/2006 | Robinson | G06Q 30/0236 705/14.19 |
| 2006/0224452 | A1* | 10/2006 | Ng | G06Q 30/0226 705/14.27 |
| 2006/0256133 | A1* | 11/2006 | Rosenberg | G06F 3/013 345/619 |
| 2007/0124756 | A1* | 5/2007 | Covell | H04N 21/858 348/E7.071 |
| 2007/0179850 | A1* | 8/2007 | Ganjon | G06Q 30/0236 705/14.27 |
| 2007/0192784 | A1* | 8/2007 | Postrel | G06Q 30/0229 725/23 |
| 2007/0214049 | A1* | 9/2007 | Postrel | G06Q 30/02 725/32 |
| 2008/0059521 | A1 | 3/2008 | Hutson et al. | |
| 2009/0198701 | A1* | 8/2009 | Haileselassie | G06F 16/9535 |
| 2009/0313670 | A1* | 12/2009 | Takao | H04N 21/8586 725/110 |
| 2010/0034466 | A1* | 2/2010 | Jing | G06K 9/6256 382/195 |
| 2010/0114713 | A1* | 5/2010 | Anderson | G06Q 20/10 705/14.69 |
| 2011/0273455 | A1* | 11/2011 | Powar | G11B 27/10 345/473 |
| 2012/0011545 | A1* | 1/2012 | Doets | H04L 65/80 725/38 |
| 2012/0076310 | A1* | 3/2012 | DeBusk | G06F 16/685 381/56 |
| 2012/0117596 | A1* | 5/2012 | Mountain | H04N 21/47 725/39 |
| 2012/0191231 | A1* | 7/2012 | Wang | G06F 16/7834 700/94 |
| 2012/0295560 | A1* | 11/2012 | Mufti | H04B 13/00 455/95 |
| 2012/0297400 | A1* | 11/2012 | Hill | G06F 9/445 719/318 |
| 2012/0316969 | A1* | 12/2012 | Metcalf, III | G06Q 30/0269 705/14.66 |
| 2012/0317240 | A1* | 12/2012 | Wang | G06F 16/95 709/219 |
| 2013/0029762 | A1* | 1/2013 | Klappert | A63F 13/792 463/31 |
| 2013/0031579 | A1* | 1/2013 | Klappert | H04N 21/454 725/32 |
| 2013/0042262 | A1* | 2/2013 | Riethmueller | H04N 21/25866 725/14 |
| 2013/0044051 | A1* | 2/2013 | Jeong | H04N 21/441 345/156 |
| 2013/0067512 | A1* | 3/2013 | Dion | H04N 21/2543 725/32 |
| 2013/0073366 | A1* | 3/2013 | Heath | G06Q 30/0261 705/14.25 |
| 2013/0073377 | A1* | 3/2013 | Heath | G06Q 30/02 705/14.39 |
| 2013/0080242 | A1* | 3/2013 | Alhadeff | G06F 16/957 705/14.39 |
| 2013/0080262 | A1* | 3/2013 | Scott | G06Q 30/02 705/14.68 |
| 2013/0083859 | A1 | 4/2013 | Nemiroff et al. | |
| 2013/0085828 | A1* | 4/2013 | Schuster | G06Q 30/0207 705/14.39 |
| 2013/0111519 | A1* | 5/2013 | Rice | G06Q 30/02 725/34 |
| 2013/0124073 | A1* | 5/2013 | Ren | G01C 21/3694 701/118 |
| 2014/0137139 | A1* | 5/2014 | Jones | H04N 21/4394 725/18 |
| 2014/0278845 | A1* | 9/2014 | Teiser | H04N 21/812 705/14.4 |
| 2014/0282671 | A1* | 9/2014 | McMillan | H04N 21/44008 725/19 |
| 2015/0052571 | A1* | 2/2015 | Stokking | H04N 21/8547 725/116 |
| 2015/0128180 | A1* | 5/2015 | Mountain | H04N 21/44004 725/39 |
| 2015/0229979 | A1* | 8/2015 | Wood | H04N 21/4663 725/14 |
| 2015/0237389 | A1* | 8/2015 | Grouf | H04N 21/4882 725/49 |
| 2015/0281786 | A1 | 10/2015 | Oh et al. | |
| 2015/0341681 | A1 | 11/2015 | Miller et al. | |
| 2016/0057490 | A1* | 2/2016 | Besehanic | H04H 60/31 725/19 |
| 2016/0127793 | A1* | 5/2016 | Grouf | H04N 21/23424 725/46 |
| 2016/0165287 | A1* | 6/2016 | Wood | H04N 21/4667 725/14 |
| 2016/0182973 | A1* | 6/2016 | Winograd | H04N 21/8358 725/25 |
| 2016/0323650 | A1* | 11/2016 | Grouf | H04N 21/4316 |
| 2016/0345074 | A1 | 11/2016 | Serbest et al. | |
| 2017/0078727 | A1* | 3/2017 | Wood | H04N 21/23424 |
| 2017/0280176 | A1 | 9/2017 | Gordon | |
| 2017/0324995 | A1* | 11/2017 | Grouf | H04N 21/4825 |
| 2018/0027306 | A1 | 1/2018 | An et al. | |
| 2018/0262805 | A1* | 9/2018 | Grouf | H04N 21/4532 |
| 2019/0028777 | A1 | 1/2019 | Rao | |
| 2020/0029115 | A1 | 1/2020 | Dunker et al. | |
| 2020/0275141 | A1* | 8/2020 | Merchant | H04N 21/8545 |
| 2020/0275168 | A1* | 8/2020 | Merchant | G06F 21/64 |
| 2020/0296436 | A1 | 9/2020 | Dunker et al. | |
| 2020/0404366 | A1* | 12/2020 | Ropke | H04N 21/8547 |

OTHER PUBLICATIONS

Office action in U.S. Appl. No. 15/929,216, dated Oct. 29, 2020.
Office action in U.S. Appl. No. 15/929,216, dated Apr. 2, 2021.

* cited by examiner

100 # USE OF STEGANOGRAPHICALLY-ENCODED TIME INFORMATION AS BASIS TO ESTABLISH A TIME OFFSET, TO FACILITATE TAKING CONTENT-RELATED ACTION

REFERENCE TO RELATED APPLICATION

This is a continuation of U.S. patent application Ser. No. 15/929,220, filed Feb. 6, 2020, which claims priority to U.S. Provisional Patent Application No. 62/865,607, filed Jun. 24, 2019, the entirety of each of which is hereby incorporated by reference.

BACKGROUND

A typical media client operates to receive an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, mobile communication devices, gaming consoles, streaming media players, and the like.

By way of example, a television could receive a broadcast stream (e.g., over the air, from a set top box, through an Internet connection, or in another manner) and could present the media content of that broadcast stream to a user. As another example, a set top box could receive a broadcast stream from a multi-channel video program distributor and could output the media content of that stream via a High-Definition Multimedia Interface (HDMI) cable or other interface to a television and/or audio/video receiver for playout. As still another example, a digital video or audio recorder could likewise receive a broadcast stream but could store the broadcast stream for later playout. And as yet another example a loudspeaker or headphones could receive a broadcast audio stream from a radio, computer, or other device, and could present the audio content of that stream to a user. Numerous other examples are possible as well.

SUMMARY

When a media client receives, outputs, or otherwise processes a linear media stream for presentation to a user (e.g., when the media client is transcoding and/or rendering each frame of the media content to facilitate presentation of the content on user interface, and/or is otherwise processing the ongoing media stream), it may be useful in certain situations for the client to take special action with respect to the media content. Without limitation, for instance, it may be useful for the client to revise a portion of the stream's media content, such as to dynamically replace playout of an ad or other segment of the media content with playout of a replacement ad or with other replacement content, or to dynamically supplement playout of a portion of the media content with overlay or split-screen content, such as channel identification, context information, ad content, or the like.

Further, it may be desirable for the client to perform such content revision at a specific time point within the media stream. For instance, if the client is to dynamically replace an existing ad with a replacement ad, it may be desirable for the client to position the replacement ad at a particular time in the media stream when the existing ad would have started. Likewise, if the client is to supplement a specific portion of the media content with an overlay related to that portion, it may be desirable for the client to start the overlay when that portion starts. Other examples are possible as well.

More particularly, the media stream at issue could define a sequence of frames, such as video frames and/or audio frames, and it may be desirable for the client to perform the content revision on a frame-accurate basis. For instance, for ad replacement, it may be desirable for the client to insert the replacement ad in place of the existing ad starting precisely at the first frame of the existing ad. And for adding an overlay to a specific portion of the media stream, it may be desirable for the client to start the overlay at or in specific relation to the first frame of that portion of the media stream.

To facilitate having the client take this or other such action at a desired time point within the media stream that the client is outputting for presentation, a server or other entity (hereafter "server") external to the client could engage in signaling with the client, providing the client with a directive for the client to take the action, and specifying the time point when the client is to take the action ("action time point"). The client could then take the action at the specified time point.

One technical issue that can arise in this process, however, is that the server may specify the action time point in the media stream using a different time reference than the client uses. Therefore, when the server tells the client to take an action at a particular action time point within the media stream, the server may specify that action time point as a time measured from the perspective of the server, i.e., according to "server time." But that time may correspond with a different time measured from the client's perspective, i.e., according to "client time."

As an example of this, consider a scenario where the server interworks with a content distribution system that is outputting the media stream for distribution in real time to the client, and where the server uses server time to describe time points in the media stream. In that scenario, even if the content distribution system and media client have synchronized time clocks, there may be a transmission delay defining an amount of time that it takes for each successive frame of the media stream to travel from the content distribution system to the media client. As a result, there would be a difference between the server time of each such frame and the client time of each such frame.

In that scenario, if the server has determined that the client should take action, such as performing content revision, at a particular frame of the media stream (e.g., starting at that particular frame), the server may determine that that frame exists at a particular time point measured in server time and may direct the client to perform the action at that particular time point. But due to the time delay, that particular time point measured in client time would not represent when the frame arrives or is being processed by the client. Therefore, the client may end up performing the directed action at the wrong time, or may end up not being able to perform the action at all.

In this or other situations, it could be useful to establish a mapping between server time and client time, so as to enable the client to take action with respect to the media stream at an intended time point, such as at or near a particular frame for instance. Further, as the transmission delay may differ for different pairs of media clients and content distribution systems, it could be useful to establish such a mapping respectively and separately for each of multiple such clients, possibly with respect to each of multiple content distribution systems, so as to enable each such client to take action with respect to a given media stream at issue at an intended action time point.

The present disclosure provides for use of one or more steganographically-encoded timestamps as a basis to determine this transmission delay or associated time offset on at least a per-client basis. In particular, the media stream that is being transmitted to a given client could be encoded with watermarks, each watermark being positioned at a respective position in the ongoing media stream and encoding a timestamp that defines a server time of that media-stream position. As the client receives and/or processes the ongoing media stream, the client could thus decode one or more such watermarks from the media stream in order to extract from the watermark the server time, and the client could compare that extracted server time to a current reading of client time, to compute a delay from the server time to the client time. The client could then use that computed delay as a basis to facilitate taking action when provided with an action time point specified in server time.

The client could decode multiple such watermarks from the media stream and, for each watermark, could compute a respective time offset between the indicated server time and the current client time. These offsets may all be the same, or they may vary slightly for one reason or another. The client could further compute an ongoing average or other statistical measure of those computed offsets, perhaps on a sliding window basis, as a representative offset that the client could then use as a basis to facilitate taking action when provided with a server timestamp for when the action is to be taken.

In an example implementation, as the client is receiving the ongoing media stream, if the client receives a directive to take an action, such as a content revision, at a particular server time, the client could then apply (e.g., add) the client's computed offset to that particular time in order to compute a corresponding client time. And the client could then take the desired action at that computed client time, which should thereby take into account transmission delay.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
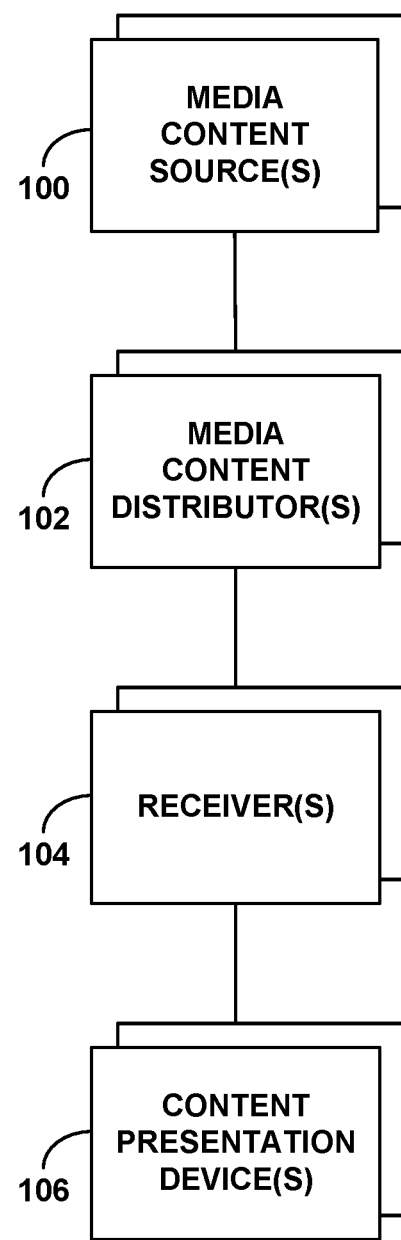
FIG. 1 is a simplified block diagram of an example system in which various disclosed principles can be applied.

The present disclosure will discuss example implementation in connection with media clients comprising content presentation devices such as televisions, loudspeakers, or the like. It will be understood, however, that various principles disclosed could extend to apply with respect to other types of media clients, such as set top boxes or other receivers, mobile phones, and the like. Further, it will be understood that various arrangements and processes described herein can take various other forms. For instance, elements and operations can be re-ordered, distributed, replicated, combined, omitted, added, or otherwise modified. And it will be understood that functions described herein as being carried out by one or more entities could be implemented by and/or on behalf of those entities, through hardware, firmware, and/or software, such as by one or more processing units executing program instructions or the like.

Referring to the drawings, as noted above, FIG. 1 is a simplified block diagram of an example system in which various disclosed principles can be applied.

As shown in FIG. 1, the example system includes one or more media content sources 100 (e.g., broadcasters, web servers, etc.), one or more media content distributors 102 (e.g., multi-channel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, for instance, the media content sources 100 could be national broadcasters, such as ABC, NBC, CBS, FOX, HBO, and CNN, the media content distributors 102 could be local affiliates and/or other local content distributors, possibly for specific designated market areas (DMAs), and the receivers 104 and content presentation devices 18 could then be situated at customer premises, such as homes or business establishments.

With this or other arrangements, the content sources 100 could deliver media content to the content distributors 102 for distribution to receivers 104 at customer premises, and the content distributors could distribute the media content to the receivers 104 as particular channels of content (e.g., particular frequencies, particular streaming media sessions, or other defined channels). Each receiver could then respond to user input or one or more other triggers by tuning to or otherwise starting to receive a selected channel and outputting to a content presentation device 106 a media stream representing media content of the selected channel. And the content presentation device 106 could receive and render the media content (e.g., display or otherwise present the content).

Without limitation, for instance, the content presentation device could be a television situated at customer premises, which could be coupled by an HDMI cable with a cable-TV set top box, and the set top box could be coupled through a local distribution network with a cable-TV head end that distributes various television channels provided by national and/or local broadcasters. In this arrangement, the television could regularly receive a media stream via HDMI from the set top box, and the set top box could tune to a particular channel from the head end in response to user input, so that the media stream arriving at the television would then represent the user-selected channel. Other examples are possible as well.

Figure 2:
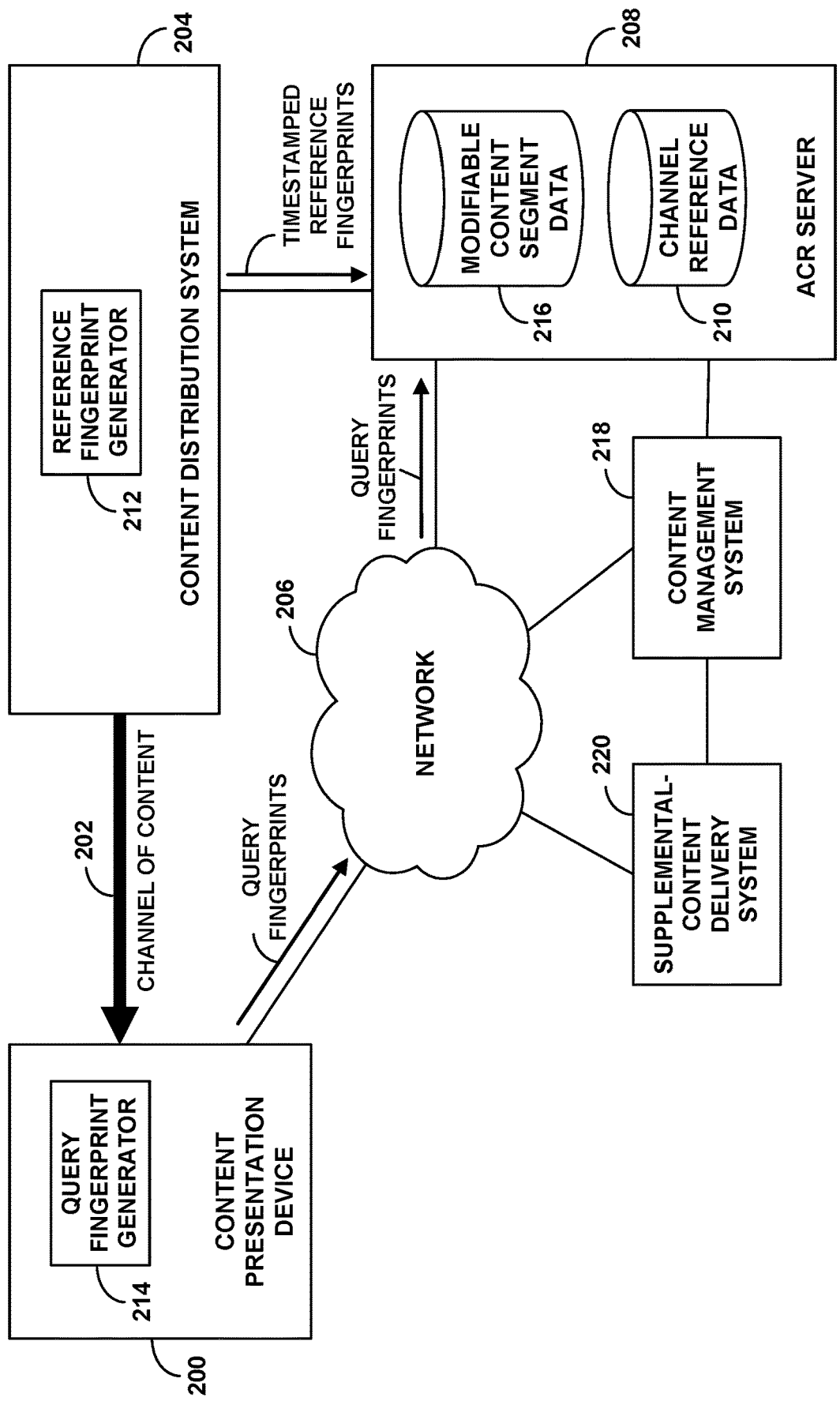
FIG. 2 is another simplified block diagram of an example system in which various disclosed principles can be applied.

FIG. 2 next illustrates more specifically an example system in which some of the presently disclosed features could be implemented.

FIG. 2 shows at its top a representative content presentation device 200 receiving a channel of content 202 being provided by a content distribution system 204. By way of example, the content presentation device 200 could be an example content presentation device 100 as shown in FIG. 1, and the content distribution system 204 could comprise any system that outputs, delivers, or otherwise provides media content, perhaps as a representative media content source 100 and/or media content distributor 102 of FIG. 1, among other possibilities.

As such, the content presentation device 200 could be receiving and rendering the channel of content 202 in a media stream directly or indirectly from the content distribution system 204. The channel might be a linear broadcast feed and/or might be a streaming media channel, and the content presentation device might be receiving the channel through any of a variety of distribution channels, such as but not limited to cable, satellite, terrestrial over-the-air broadcast, or others now known or later developed.

In an example implementation, the media content of the channel could define a sequence of digital frames of media content that the media client is configured to render for presentation to a user. For instance, a media content source, media content distributor, and/or other entity might be broadcasting, streaming, or otherwise providing this sequence of frames encapsulated in a transport stream for receipt by a receiver (e.g., that is currently set to receive the channel of content), and the receiver may be extracting the sequence of frames from the transport stream and outputting the sequence of frames as the media stream for receipt and rendering by the media client.

As further shown in FIG. 2, the content presentation device 200 is interconnected with a communication network 206, which could be a packet-switched network such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the media stream representing the channel of content 202 provided by the content distribution system 204.

Shown accessible via the network 206 (e.g., at a defined IP address on the network) is an automatic content recognition (ACR) server 208, which could operate to identify the channel of content being rendered by the content presentation device 200 and to coordinate having the content presentation device engage in channel-specific action, such as dynamic content modification of content included on the identified channel.

In practice, the ACR server 208 could determine in various ways the channel of content being rendered by the content presentation device 200. As one example, if the content presentation device 200 has information that identifies the channel of content being rendered, the content presentation device 200 might transmit to the ACR server 208 a message that specifies the channel being rendered. Alternatively, the ACR server 208 and content presentation device 200 could cooperatively engage in fingerprint-based ACR to identify the channel.

With fingerprint-based ACR, the ACR server 208 could be provisioned with reference data that includes digital reference fingerprints respectively representing each of various known channels of media content (e.g., each of the channels within a subscription plan for a set-top box that supplies media content to the content presentation device) and that maps the reference fingerprints to the respective channels that they represent. Further, the ACR server 208 could receive digital query fingerprints that represent the media content currently being rendered by the content presentation device, and the ACR server 208 could compare the query fingerprints with the reference fingerprints in an effort to find a match. Upon finding that the query fingerprints match the reference fingerprints mapped to a particular channel, the ACR server 208 could thus determine that the channel being rendered by the content presentation device is that particular channel.

In an example implementation of fingerprint-based ACR, the content distribution system 204 that distributes each of one or more known channels of media content to content presentation devices could regularly provision the ACR server 208 with reference data 210 to enable the ACR server 208 to conduct the fingerprint analysis.

In particular, for each of one or more channels that the content distribution system is distributing, the content distribution system 204 could apply a reference-fingerprint generator 212 (e.g., program instructions executable by a processor of the content distribution system 204) to generate reference fingerprints on a per-frame basis or other ongoing basis, and the content distribution system 204 could establish for each such reference fingerprint an associated reference timestamp according to server time indicated by a clock of the content distribution system 204. Further, the content distribution system 204 could regularly transmit to the ACR server 208 the reference fingerprints, specifying for each reference fingerprint the associated reference timestamp and the channel whose frame the reference fingerprint represents.

Without limitation, an example digital fingerprinting process as to video content could apply on a per video frame basis and could involve establishing a representation of luminosity and/or other video characteristics. For instance, for a given video frame, the fingerprint generator 212 could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator 212 could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well.

Server time according to the clock of the content distribution system 204 could represent the progress of time (e.g., in milliseconds or microseconds) as the content distribution system outputs and/or otherwise processes the sequence of frames of a channel of content for distribution. Thus, as the content distribution system 204 processes those frames, the content distribution system 204 could generate for each of one or more of the frames a respective reference fingerprint and, based on its internal clock, could determine and record the current server time as the respective reference timestamp of the reference fingerprint. The content distribution system could carry out this timestamping process for each reference fingerprint regularly at the same processing step of the underlying frame represented, such as when the content distribution system 204 is outputting the frame as a next frame for distribution, among other possibilities.

The ACR server 208 could thus regularly receive from the content distribution system 204 the reference data including these reference fingerprints, each being tagged or otherwise associated with information that maps the reference fingerprint to the channel whose frame the reference fingerprint represents, and each being tagged or otherwise associated with an associated reference timestamp defining server time of the underlying frame of content. And as the ACR server 208 receives this reference data, the ACR server 208 could store the reference data in a relational database or other form suitable for ready searching and access.

In addition, as the content presentation device 200 receives and renders a media stream representing a given channel of media content, the content presentation device could generate the query fingerprints of the media content on a pre-frame basis or other ongoing basis and could regularly transmit the generated query fingerprints to the ACR server 208 for analysis.

To facilitate this, the content presentation device 200 in an example implementation could be equipped with a fingerprint generator 214 (e.g., program instructions executable by a processor of the content presentation device 200), configured to generate query fingerprints representing the media content of the channel 202 that the content presentation device 200 is currently rendering. The fingerprint generator 214 could be configured to receive as input a copy of the media content of the channel as the media content arrives at the content presentation device 200 and/or is processed for presentation by the content presentation device 200, and the fingerprint generator 214 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could transmit its generated query fingerprints via network 206 to the ACR server 208 for analysis, to enable the ACR server 208 to engage in fingerprint-based ACR and coordination of associated channel-specific action. By way of example, the content presentation device 200 could periodically or otherwise from time to time transmit to the ACR server 208 the query fingerprints representing a latest series of frames of the channel being rendered by the content presentation device 200. For instance, the content presentation device 200 could generate a message carrying the latest generated query fingerprints and could transmit the message to the IP address of the ACR server 208 for analysis.

Given the query fingerprints representing media content of the channel 202 being rendered by the content presentation device 200, and given the reference data including reference fingerprints respectively representing each of various known channels, the ACR server 208 could engage in fingerprint-based ACR processing. For instance, on an ongoing basis or in response to one or more trigger events, the ACR server 208 could compare the query fingerprints provided by the content presentation device 200 with the reference fingerprints provided by the content distribution system 204.

To compare a given query fingerprint with a given reference fingerprint, the ACR server 208 could compare corresponding portions of the fingerprints with each other to determine whether the portions match exactly or within defined tolerances. For example, the ACR server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of a particular channel, the ACR server 208 could then conclude that that is the channel being rendered by the content presentation device 200.

In a representative implementation, once the ACR server 208 has determined, through fingerprint-based ACR or any in any other manner, the channel that the content presentation device is rendering, the ACR server 208 or another entity could then engage in a process to facilitate dynamic content modification, such as targeted advertisement replacement. Thus, the dynamic content modification could be responsive to the fingerprint-based ACR.

By way of example, once the ACR server has determined the channel that the content presentation device is rendering, the ACR server could then use that determined channel identity as a basis to detect when a content-modification opportunity is about to occur on that particular channel. And the ACR server or other entity could then responsively cause the content presentation device to carry out a content modification at the time of the content-modification opportunity.

This example channel-specific action could take advantage of the time delay that is likely to exist from the point in time when the content distribution system 204 outputs media content of the channel for transmission to the content presentation device 200 to the point in time when the content presentation device 200 receives and/or renders that media content. Depending on the configuration of the system, this delay could be on the order of 5-10 seconds.

Given that delay, it may be possible for the content distribution system 204, the ACR server 208, and/or one or more other entities to detect the presence of particular content defining a content-modification opportunity on the channel that is en route to (e.g., about to be or being distributed to) the content presentation device 200 well enough before that content arrives at the content presentation device 200. By engaging in relatively quick out-of-band (e.g., IP-based) communication with the content presentation device 200 during that delay period, the ACR server 208 could then prepare the content presentation device 200 to engage in content modification with respect to the detected content, so that when the detected content ultimately arrives at the content presentation device 200 and/or is ready for presentation by the content presentation device 200, the content presentation device 200 could carry out the content modification in a timely manner.

As to content modification, for instance, the ACR server 208 could be provisioned in advance with modifiable-content segment data 216 that includes digital fingerprints respectively representing each of various modifiable-content segments of media content, along with associated metadata per modifiable-content segment, such as a duration of the segment, an identifier of the segment, a type of associated content modification (e.g., replacement or overlay) and the like. For instance, a content management system 218 could generate and provide this information in advance to the ACR server.

Having identified the channel being rendered by the content presentation device, the ACR server 208 could then compare the ongoing sequence of reference fingerprints representing that identified channel with the fingerprints representing the various modifiable-content segments. And upon finding with sufficient certainty that the reference fingerprints of the identified channel match the fingerprints representing a particular modifiable-content segment, the ACR server 208 could reasonably conclude that the media content en route to the content presentation device includes that modifiable-content segment. Further, the ACR server could thereby determine from the reference data 210 of the identified channel the reference timestamp indicating when the modifiable content segment is present on the channel.

Upon so detecting the presence of a modifiable-content segment in the media content of the channel that is en route to the content presentation device 200, the ACR server 208 could then responsively engage in out-of-band signaling with the content presentation device 200 to enable, cause, and prepare the content presentation device to perform a content modification with respect to that particular modifiable-content segment.

For instance, the ACR server 208 could provide the content presentation device 200 with timing information regarding the upcoming content modification opportunity. This timing information regarding the upcoming content modification opportunity could include the reference timestamp that the reference data 210 indicates for the reference fingerprint representing the first frame of the modifiable-content segment. With this timing information, the content presentation device 200 could accordingly plan to carry out a content modification at the indicted action time point.

Further, the ACR server 208 could provide the content presentation device with various other information regarding the modifiable content segment, to enable the content presentation device to carry out the content modification at the indicated time of the modifiable-content segment. For instance, the ACR server 208 could provide the content presentation device with metadata as described above, such as a duration of the segment, an identifier of the segment, and a type of associated content modification (e.g., replacement or overlay) and the like.

With this information, the content presentation device 200 could then responsively work with the content management system 218 and/or another entity to obtain details of the content modification to perform with respect to the upcoming modifiable-content segment. For instance, the content presentation device 200 could transmit to the content management system 218 a request that provides the content management system 218 with the modifiable-content segment identifier and other associated metadata about the modifiable content segment. And the content management system 218 could responsively provide the content presentation device 200 with information to facilitate the content modification.

The content management system 218 could use various information as a basis to determine supplemental content that the content presentation device 200 should render in place of or as an overlay superimposed on the modifiable-content segment. For instance, the content management system 218 could use user-demographics, location, and/or other information regarding the content presentation device 200 as a basis to determine appropriate supplemental content.

Further, the content management system 218 could ascertain a storage location of determined supplemental content and could provide the content presentation device 200 with an indication of that storage location. For instance, the content management system 218 could query a supplemental-content delivery system 220 to determine a uniform resource locator (URL) or other address from which the content presentation 200 device could obtain the supplemental content from a network server or from local data storage of the content presentation device 200. And the content management system 218 could provide the content presentation device 200 with that address and/or with other information to enable the content presentation device 200 to obtain the supplemental content. Alternatively, the content management system 218 itself or another entity could provide the content presentation device 200 with the supplemental content.

With this information, the content presentation device 200 could thus obtain the supplemental content and could plan to present the supplemental content (e.g., as replacement or overlay) at the time of the modifiable-content segment on the channel that the content presentation device 200 is rendering.

The example content-modification process described so far could be carried out for various purposes. Without limitation, for instance, the content-modification process could be carried out to facilitate dynamic advertisement insertion (DAI), in which the content presentation device replaces a generally applicable ad (e.g., a nationally broadcast ad) with a replacement ad possibly selected based on location, user demographics, and/or other information specific to the content presentation device.

For DAI, an entity such as content broadcaster, distributor, or ad-replacement service might enter into agreements with advertisers to facilitate replacing playout of certain ads, deemed "replaceable ads," with different ads, deemed "replacement ads." For each of various replaceable ads, the content management system 218 or other entity could then receive a copy of the replaceable ad and could provision the ACR server 208 with digital fingerprints representing the replaceable ad and with associated data regarding the replaceable ad. For instance, for each replaceable ad, the content management system 218 could generate digital fingerprints of the replaceable ad on a per-frame basis or the like and could transmit to the ACR server 208 the generated fingerprints of the replaceable ad along with metadata as described above, such as a unique identifier of the replaceable ad, a duration of the replaceable ad, an indication that the ad is to be replaced, and so forth. (Further, the data provided to the ACR server 208 could include a traffic schedule that indicates when specific ads, with particular identifiers and associated fingerprints, are scheduled to be presented on each of one or more channels.)

Once the ACR server 208 has identified the channel being rendered by the content presentation device 200, the ACR server 208 could then responsively compare the reference fingerprints representing that identified channel with the fingerprints representing various replaceable ads. And upon finding with sufficient certainty that the reference fingerprints of the identified channel match the fingerprints representing a particular replaceable ad, the ACR server 208 could reasonably conclude that the channel being rendered by the content presentation device 208 includes the replaceable ad, and more specifically that the media content en route to the content presentation device 208 includes that replaceable ad.

In response to this conclusion, the ACR server 208 and/or another entity could engage in signaling with the content presentation device 200 to prepare the content presentation device 200 to present a replacement ad in place of the replaceable ad. In line with the discussion above, for instance, the ACR server 208 or other entity could transmit to the content presentation device 200, through out-of-band signaling, one or more messages that provide the content presentation device 200 with (i) a reference timestamp as described above that indicates when the replaceable ad will occur on the channel that the content presentation device 200 is rendering, (ii) the unique identifier of the replaceable ad, and (iii) a duration of the replaceable ad.

Given the identifier and duration of the replaceable ad, the content presentation device 200 could then engage in out-of-band signaling with the content management system 218 to ascertain a replaceable ad that the content presentation device should render in place of the replaceable ad. Here, the content presentation device 200 might provide the content management system 218 with a user identification, demographics, location, and/or other information that the content management system 218 could use as a basis to select an appropriate replacement ad. Further, the content management system 218 could use the duration of the replaceable ad, indicated by the content presentation device 200 or mapped to the ad-identifier of the replaceable ad for instance, to select a replacement ad that is of the same duration as the replaceable ad.

The content management system could then work with the supplemental-content delivery system 220 to determine a URL or other address or location from which the content presentation device could obtain the replacement ad and could inform the content presentation device 200 accordingly. And the content presentation device 200 could thus obtain the replacement ad and plan to render it in place of the replaceable ad on the channel that the content presentation device 200 is rendering, as discussed above.

As discussed above, a technical difficulty with this process is that, when the ACR server 208 directs the content presentation device 200 to carry out a content modification at a particular time point, the ACR server 208 may specify that particular time point using a different time reference than the content presentation device 200 uses.

As noted above, for instance, once the ACR server 208 has identified a modifiable-content segment on the channel being rendered by the content presentation device 200, the ACR server 208 may determine that the start time of that modifiable-content segment is the server time that content distribution system 204 specified as the reference timestamp for the reference fingerprint representing a first frame of the modifiable-content segment. Therefore, the ACR server 208 may specify that server time point as the action time point when the content presentation device 200 should start the content modification. However, given the transmission delay for delivery of each such frame of the channel from the content distribution system 204 to the content presentation device 200, that specified time point may not correctly represent the time of arrival or processing of that first frame according client time at the content presentation device.

By way of example, if the clocks at the content distribution system 204 and content presentation device 200 are synchronized with each other (e.g., if both are synchronized with a common time clock such as network time, GPS time, or the like), and if the transmission delay is 10 seconds, then the action time point that the ACR server 208 specifies in its directive to the content presentation device 200 would be 10 seconds before the modifiable content segment actually starts at the content presentation device 200.

As noted above, the present disclosure helps to overcome this problem by providing a mechanism for mapping between server time and client time, to enable the content presentation device 200 to take action at an appropriate point in time. Further, because the delay and the associated time offset could vary per content presentation device and/or per content distribution system, the disclosure contemplates establishing and applying such a mapping on a case by case basis.

As indicated above, the disclosure provides for use of one or more steganographically-encoded timestamps as a basis to determine this transmission delay or at least the associated time offset, so as to then translate an indicated action time point in server time into an action time point in client time.

In particular, one or more media streams of one or more channels received and/or processed by the content presentation device 200 for presentation could be encoded with one or more watermarks that encode time information according to server time, i.e., according to the same clock that would form the basis for the ACR server's indication of when a content-modification opportunity would occur. The content presentation device 200 could thus decode the time information from one or more such watermarks and, by comparison with client time according to the content presentation device's own clock, could compute an associated time offset.

The content presentation device could then use that computed time offset as a basis to determine when to carry out content modification on a channel of content, given an ACR-server-provided reference timestamp indicating when to carry out the content modification. Here, the channel of content in which the content modification would be carried out could be one of the one or more channels in which the one or more timestamp-watermarks were encoded and used as a basis to determine the time offset, or the channel of content could be another channel of content.

Figure 3:
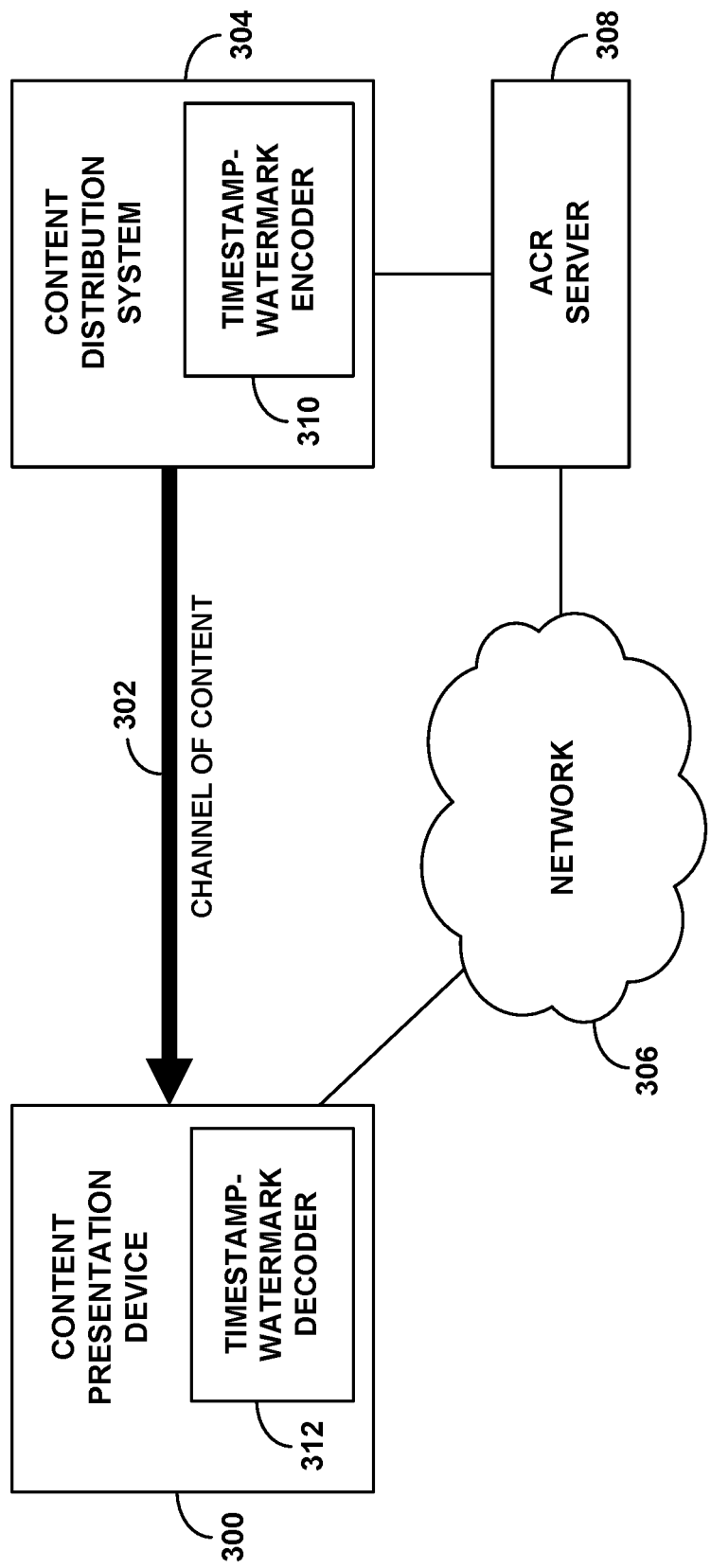
FIG. 3 is a simplified block diagram illustrating components that could be involved in an example implementation.

FIG. 3 is a simplified block diagram illustrating components that could be involved in an example implementation. In particular, FIG. 3 illustrates a content presentation device 300, a content distribution system 304, and an ACR server 308.

The content presentation device 300, content distribution system 304, and the ACR server 308 could be examples of the content presentation device 200, the content distribution system 204, and the ACR server 208 discussed above. For instance, the content presentation device 300 could be a television located at customer premises, the ACR server 308 could be a network server configured to carry out fingerprint matching, content identification, and triggering of dynamic content modification as discussed above, with the content presentation device 300 and ACR server 308 being in communication with each other via a network 306 such as the Internet. Further the content distribution system 304 could operate to distribute a media stream in a channel of content directly or indirectly to the content presentation device 300.

As further shown in FIG. 3, the content distribution system 304 could include a timestamp-watermark encoder 310 that the content distribution system 304 could use in order to encode one or more timestamp-watermarks into a media stream that is being delivered (e.g., is now being delivered or will be delivered) to the content presentation device 300. And the content presentation device 300 could include a timestamp-watermark decoder 312 that the content presentation device 300 could use in order to decode one or more timestamp-watermarks from a media stream that the content presentation device 300 is receiving and/or processing for presentation. Each of these components could comprise software stored in data storage and executable by a processing unit and/or could take other forms.

As is known in the art, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking may permanently change the media content and be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

In line with the discussion above, each timestamp-watermark that the content distribution system 304 encodes into the media stream could be at a respective position in the media stream, such as at a particular frame of the media stream, and could encode a server-time timestamp of that position of the media stream. By way of example, the content distribution system 304 could encode each watermark at or in relation to a respective frame of the media stream and could have the watermark encode a timestamp established according to the same clock that the content distribution system 304 uses as a basis for establishing the reference-fingerprint timestamps that the content distribution system 304 provides to the ACR server 308, and thus according to the same time reference that the ACR server 308 would use as a basis to designate an action time point this or another media stream.

As the content presentation device 300 receives and/or processes one or more such media streams, the content presentation device 300 could then detect and decode one or more such watermarks from the media stream(s), extracting or otherwise determining the server time encoded by the watermark. And for each such watermark, the content presentation device 300 could compute a respective time offset between the watermarked server time and the current client time according content presentation device's own clock. And if the content presentation device 300 computes multiple such time offsets, the content presentation device 300 could compute an ongoing average or other representative time offset over a sliding window of time or the like.

The content presentation device 300 could then use this computed time offset as a basis to facilitate carrying out content modification at an action time point specified by the ACR server 308.

As noted above, for instance, when the content presentation device 300 is receiving and/or processing a channel of content 302 comprising a media stream and the content presentation device 300 receives from the ACR server 308 a directive to carry out dynamic content modification at a particular action time point measured in server time (e.g., determined by the ACR server 308 from a reference timestamp provided by the content distribution system 304), the content presentation device 300 could apply the computed time offset to determine a corresponding client time when the content presentation device 300 should carry out the content modification. For instance, the content presentation device 300 could add the computed time offset to the indicated action time point in order to compute a corresponding client time point. And the content presentation device 300 could then carry out the dynamic content modification at that computed client time point, which should thereby help to take into account the transmission delay.

Figure 4:
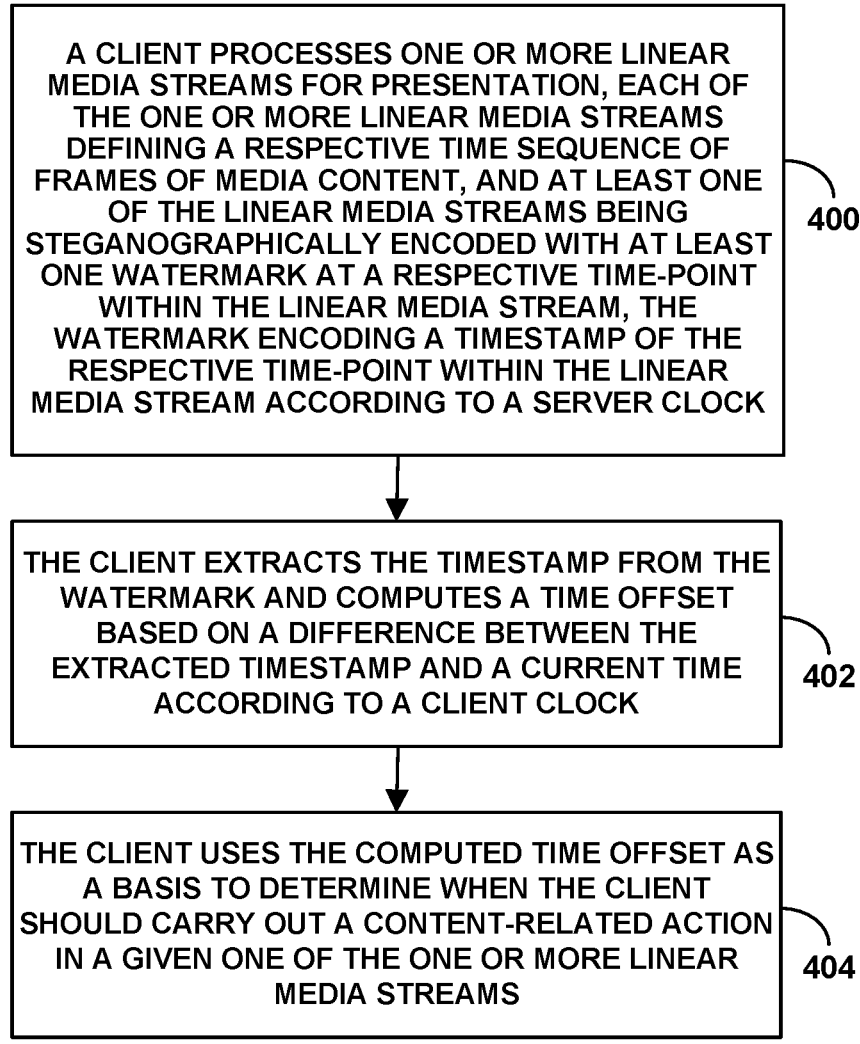
FIG. 4 is a flow chart depicting a method that could be carried out in accordance with the disclosure.

FIG. 4 is next a flow chart depicting a method that can be carried out in accordance with the present disclosure.

As shown in FIG. 4, at block 400, the method includes a client processing one or more linear media streams for presentation, each of the one or more linear media streams defining a respective time sequence of frames of media content, and at least one of the linear media streams being steganographically encoded with at least one watermark at a respective time-point within the linear media stream, the watermark encoding a timestamp of the respective time-point within the linear media stream according to a server clock. At block 402, which could occur in parallel with block 400, the client further extracts the timestamp from the watermark and computes a time offset based on a difference between the extracted timestamp and a current time according to a client clock. And at block 404, which could also occur in parallel with block 400, the client uses the computed time offset as a basis to determine when the client should carry out a content-related action in a given one of the one or more linear media streams.

In line with the discussion above, the act of computing the time offset based on the difference between the extracted timestamp and the current time according to the client clock could involve computing the time offset as the difference. Alternatively, the at least one linear media stream could be steganographically encoded with multiple watermarks each at a respective media-stream time-point and each encoding a respective timestamp of the respective media-stream time-point according to the server clock. And in that case, the method could additionally involve (i) the client extracting from each of the multiple watermarks the respective timestamp and (ii) the client computing multiple time offsets including, respectively for each extracted respective timestamp, a respective time offset between the extracted respective timestamp and a respective current time according to the client clock. The act of the client computing the time offset based on a difference between the extracted timestamp and the current time according to the client clock could then involve the client computing a statistical representation (e.g., average) of the multiple computed time offsets.

As further discussed above, the content-related action could involve dynamic content modification, such as dynamic ad replacement, among other possibilities. And the method could additionally involve the client receiving from a server a directive for the client to carry out the content-related action in the given linear media stream, with the directive specifying an action time point when the client should carry out the content-related action, and with the action time point being defined according to the server clock. And in that case, the act of the client using the computed time offset as a basis to determine when the client should carry out the content-related action in the given linear media stream could involve the client applying the computed time offset as a basis to translate the specified action time point into an associated client time point according to the client clock, such as adding the computed time offset to the specified action time point.

In addition, as discussed above, the act of the client processing the one or more linear media streams for presentation could include the client receiving each of the one or more linear media streams distributed by a content distribution system, in which case the server clock could define time according to the content distribution system, such as time used for reference-fingerprint timestamping by the content distribution system for instance. And as further discussed above, the method could additionally involve the client generating query fingerprints representing the given linear media stream and transmitting those generated query fingerprints to the server to enable the server to identify the given linear media stream.

Figure 5:
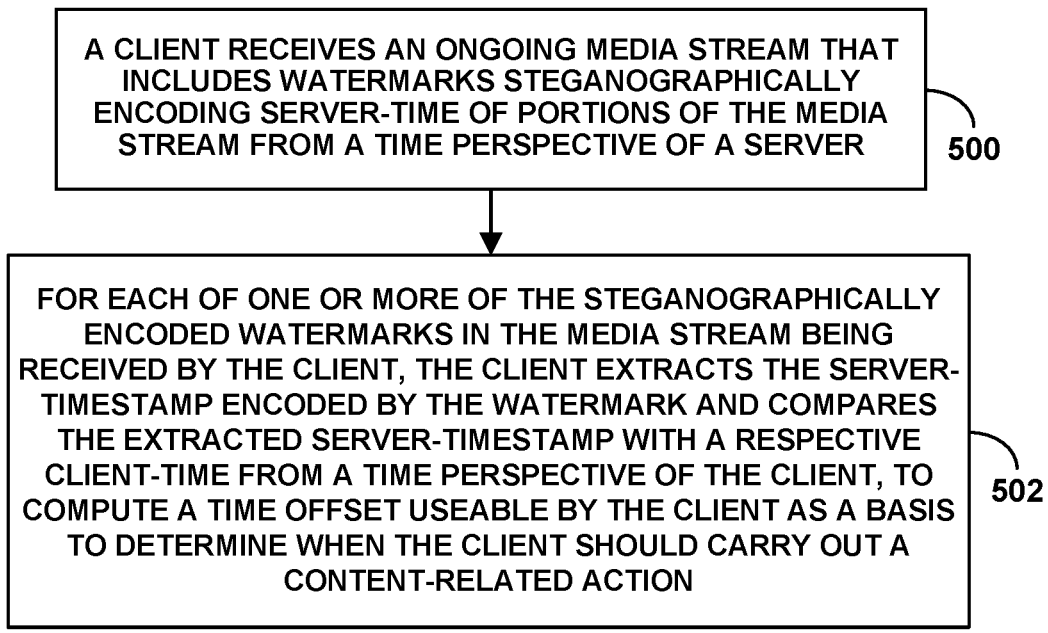
FIG. 5 is another flow chart depicting a method that could be carried out in accordance with the disclosure.

FIG. 5 is another flow chart depicting a method that can be carried out in accordance with the present disclosure.

As shown in FIG. 5, at block 500, the method includes a client receiving an ongoing media stream that includes watermarks steganographically encoding server-timestamps of portions of the media stream from a time perspective of a sever. And at block 502, which could occur in parallel with block 500, the method includes, for each of one or more of the steganographically encoded watermarks in the media stream being received by the client, the client extracting the server-timestamp encoded by the watermark and comparing the extracted server-timestamp with a respective client from a time perspective of the client, to compute a time offset useable by the client as a basis to determine when the client should carry out a content-related action, such as dynamic content modification.

Various features described above can be implemented in this context as well, and vice versa.

Figure 6:
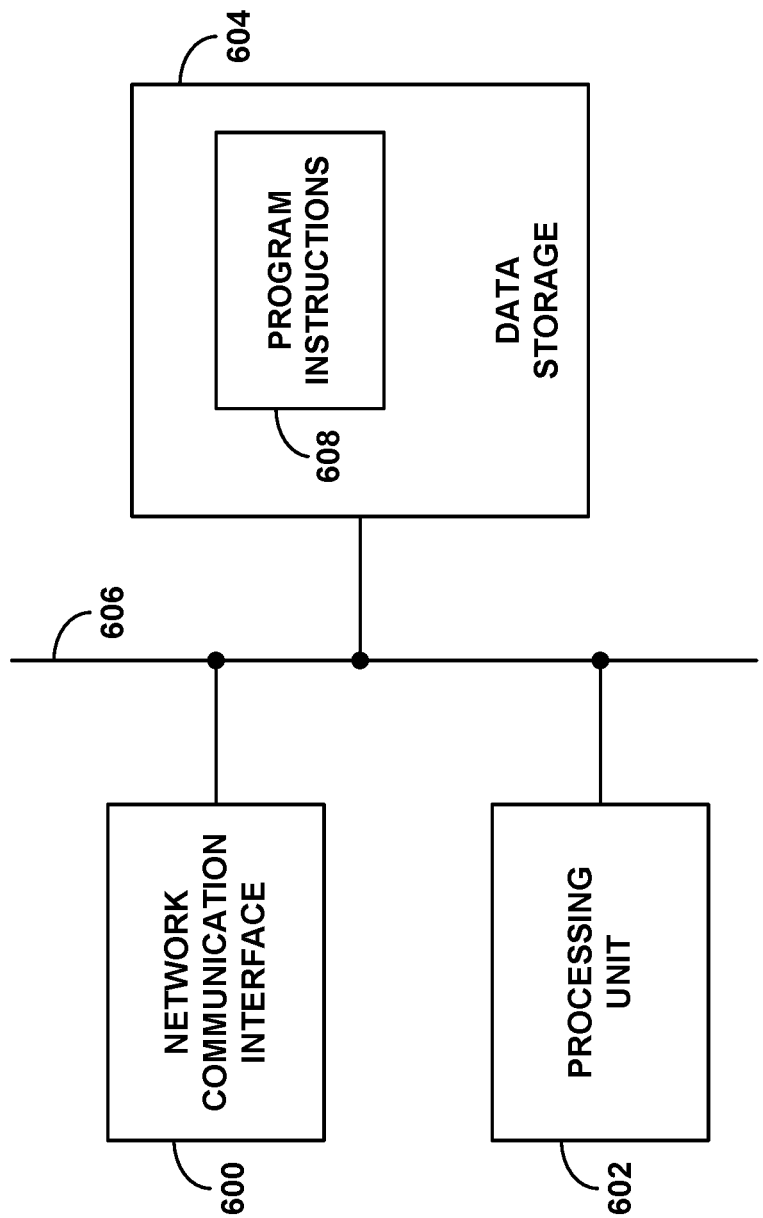
FIG. 6 is a simplified block diagram of an example system that could operate in accordance with the disclosure.

FIG. 6 is next a simplified block diagram of an example system operable in accordance with the present disclosure. This system could represent an entity of a content distribution system as described above and/or one or more other entities. As shown in FIG. 6, the example system includes a network communication interface 600, a processing unit 602, non-transitory data storage 604, any or all of which could be integrated together or, as shown, communicatively linked together by a system bus, network, or other connection mechanism 606.

Network communication interface 600 could comprise one or more physical network connection mechanisms to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

Processing unit 602, could comprise one or more general purpose processors (e.g., microprocessors) and/or one or more specialized processors (e.g., application specific integrated circuits). And non-transitory data storage 606 could comprise one or more volatile and/or non-volatile storage components, such as optical, magnetic, or flash storage.

As shown, the data storage 604 of the example system stores program instructions 608, which could be executable by processing unit 602 to carry out various operations described herein. For instance, the operations could include encoding timestamp-watermarks into a linear media stream being processed by the system for distribution to one or more content presentation devices, with each timestamp-watermark being positioned at a respective time position in the linear media stream and encoding an indication of server time of that time position, such as time measured according to a clock of the system. Further, the operations could include generating and providing to a server such as an ACR server reference fingerprints representing frames of the linear media stream, the reference fingerprints being time-stamped according to server time.

Various features described above could be implemented in this context as well, and vice versa.

Figure 7:
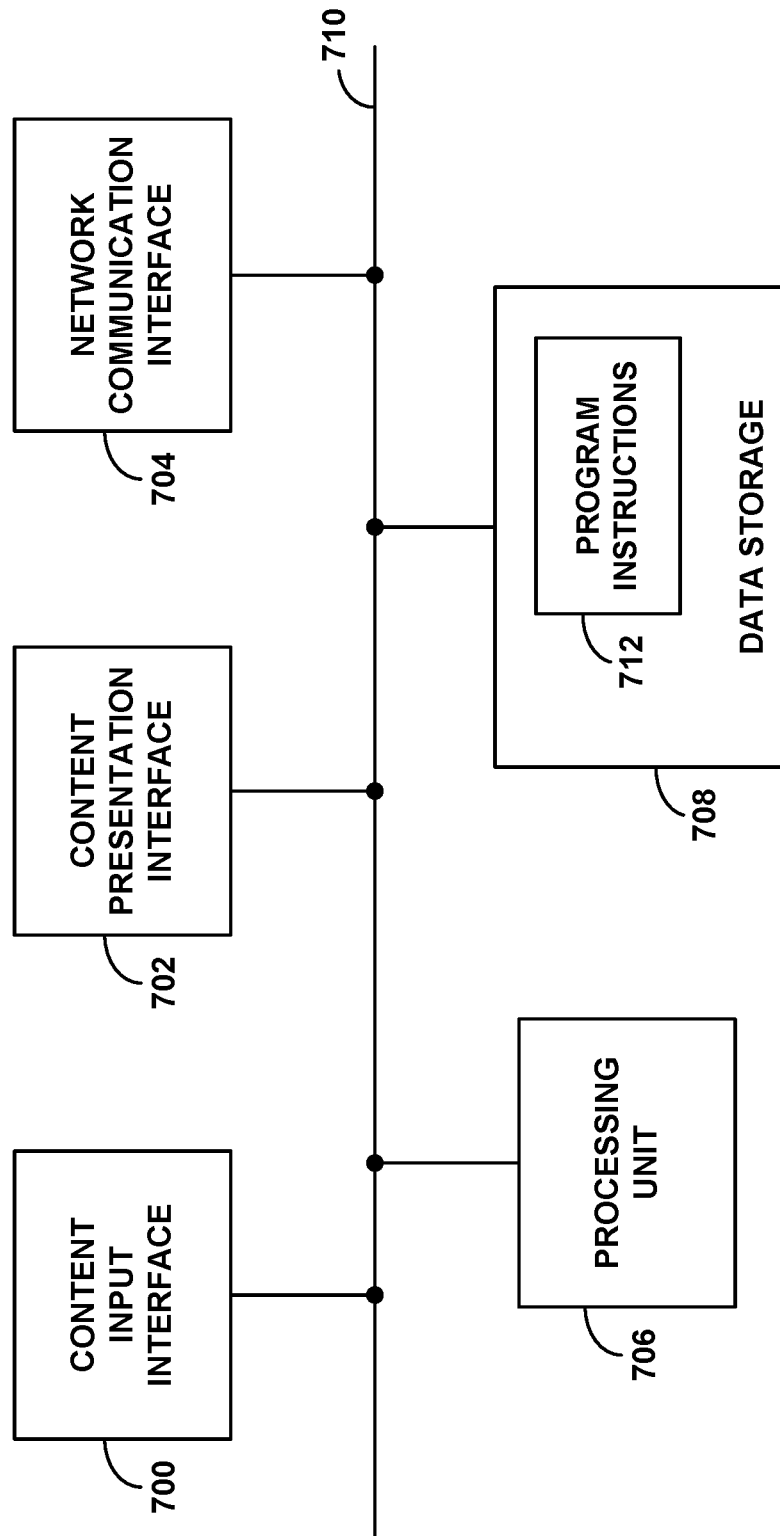
FIG. 7 is a simplified block diagram of an example media client that could operate in accordance with the disclosure.

Finally, FIG. 7 is a simplified block diagram of an example media client such as a representative content presentation device operable in accordance with the present disclosure. In line with the discussion above, this media client could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 7, the media client includes a content input interface 700, a content presentation interface 702, a network communication interface 704, a processing unit 706, and non-transitory data storage 708, any or all of which could be integrated together or, as shown, communicatively linked together by a system bus, network, or other connection mechanism 710.

Content input interface 700 could comprise a physical communication interface for receiving media content to be presented by the media client. As such, the content input interface could include one or more wired and/or wireless interfaces for establishing communication with and receiving media content in analog or digital form from a receiver or other device or system. For example, the content input interface could include one or more interfaces compliant with protocols such as DVI, HDMI, VGA, USB, BLUETOOTH, WIFI, among numerous others.

Content presentation interface 702 could then comprise one or more components to facilitate presentation of the received media content. By way of example, the content presentation interface could comprise a user interface such as a display screen and/or a loudspeaker, as well as one or more drivers or other components for processing the received media content to facilitate presentation of the content on the user interface.

Network communication interface 704 could comprise a physical network connection mechanism to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

Processing unit 706 could then comprise one or more general purpose processors (e.g., microprocessors) and/or one or more specialized processors (e.g., application specific integrated circuits). And non-transitory data storage 708 could comprise one or more volatile and/or non-volatile storage components, such as optical, magnetic, or flash storage. Further, as shown, data storage 708 stores program instructions 712, which could be executable by processing unit 706 to carry out various operations described herein.

As discussed above, these operations could include processing one or more linear media streams for presentation by the media client, each of the one or more linear media streams defining a respective time sequence of frames of media content, and at least one of the linear media streams being steganographically encoded with at least one watermark at a respective time-point within the linear media stream, the watermark encoding a timestamp of the respective time-point within the linear media stream according to a server clock. Further, the operations could include extracting the timestamp from the watermark and computing a time offset based on a difference between the extracted timestamp and a current time according to a media-client clock. And the operations could include using the computed time offset as a basis to determine when the media client should carry out a content-related action in a given one of the one or more linear media streams.

Various features described above could be implemented in this context as well, and vice versa.

Further, the present disclosure also contemplates a non-transitory computer readable medium that is encoded with, stores, or otherwise embodies program instructions executable by a processing unit to carry out various operations as described above.

Exemplary embodiments have been described above. Those skilled in the art will understand, however, that changes and modifications may be made to these embodiments without departing from the true scope and spirit of the invention.

We claim:

1. A method comprising:
processing by a client multiple linear media streams for presentation, the multiple linear media streams including a first linear media stream and a second linear media stream, each media stream of the multiple linear media streams defining a respective time sequence of frames of media content, the first linear media stream being steganographically encoded with a watermark at a time-point within first linear media stream, the watermark encoding a timestamp of the time-point within the first linear media stream according to a server clock;
extracting by the client the timestamp from the watermark, and computing by the client a time offset based on a difference between the extracted timestamp and a current time according to a client clock; and
using by the client the computed time offset as a basis to determine when the client should carry out a content-related action in the second linear media stream.

2. The method of claim 1, wherein computing the time offset based on the difference between the extracted timestamp and the current time according to the client clock comprises computing the time offset as the difference.

3. The method of claim 1, wherein the first linear media stream is steganographically encoded with multiple watermarks each at a respective media-stream time-point within the first linear media stream and each encoding a respective timestamp of the respective media-stream time-point according to the server clock, the method further comprising:
extracting by the client from each of the multiple watermarks the respective timestamp, and
computing by the client multiple time offsets including, respectively for each extracted respective timestamp, a respective time offset between the extracted respective timestamp and a respective current time according to the client clock,
wherein computing by the client the time offset based on a difference between the extracted timestamp and the current time according to the client clock comprises computing by the client a statistical representation of the multiple computed time offsets.

4. The method of claim 3, wherein the statistical measure comprises an average.

5. The method of claim 1, wherein the content-related action comprises dynamic content modification.

6. The method of claim 5, wherein the content-related action comprises dynamic ad replacement.

7. The method of claim 5, further comprising:
receiving by the client from a server a directive for the client to carry out the content-related action in the second linear media stream, the directive specifying an action time point when the client should carry out the content-related action, the action time point being defined according to the server clock,
wherein using by the client the computed time offset as a basis to determine when the client should carry out the content-related action in the second linear media stream comprises applying by the client the computed time offset as a basis to translate the specified action time point into an associated client time point according to the client clock.

8. The method of claim 7, wherein the applying the computed time offset as the basis to translate the specified action time point into the associated client time point according to the client clock comprises adding the computed time offset to the specified action time point.

9. The method of claim 7, wherein the multiple linear media streams are distributed by a content distribution system, wherein processing by a client the multiple linear media streams for presentation comprises receiving the multiple linear media streams distributed by the content distribution system, and wherein the server clock defines time according to the content distribution system.

10. The method of claim 7, further comprising:
generating, by the client, query fingerprints representing the second linear media stream; and
transmitting, from the client to the server, the generated query fingerprints to enable the server to identify the second linear media stream.

11. A media client comprising:
a content input interface;
a network communication interface;
a processing unit;
non-transitory data storage; and
program instructions stored in the non-transitory data storage and executable by the processing unit to cause the media client to carry out operations including:
processing multiple linear media streams for presentation, the multiple linear media streams including a first linear media stream and a second linear media stream, each media stream of the multiple linear media streams defining a respective time sequence of frames of media content, the first linear media stream being steganographically encoded with a watermark at a time-point within first linear media stream, the watermark encoding a timestamp of the time-point within the first linear media stream according to a server clock,
extracting the timestamp from the watermark, and computing a time offset based on a difference between the extracted timestamp and a current time according to a media-client clock, and
using the computed time offset as a basis to determine when the media client should carry out a content-related action in the second linear media stream.

12. The media client of claim 11, wherein the media client is a television.

13. The media client of claim 11, wherein the media client is a media content receiver.

14. The media client of claim 11, wherein the first linear media stream is steganographically encoded with multiple watermarks each at a respective media-stream time-point within the first linear media stream and each encoding a respective timestamp of the respective media-stream time-point according to the server clock, the method further comprising:
extracting by the client from each of the multiple watermarks the respective timestamp, and
computing by the client multiple time offsets including, respectively for each extracted respective timestamp, a respective time offset between the extracted respective timestamp and a respective current time according to the client clock,
wherein computing by the client the time offset based on a difference between the extracted timestamp and the current time according to the client clock comprises computing by the client a statistical representation of the multiple computed time offsets.

15. The media client of claim 11, wherein the content-related action comprises dynamic content modification.

16. The media client of claim 15, wherein the content-related action comprises dynamic ad replacement.

17. The media client of claim 15, wherein the operations further include:
receiving from a server a directive for the media client to carry out the content-related action in the second linear media stream, the directive specifying an action time point when the media client should carry out the content-related action, the action time point being defined according to the server clock,
wherein using the computed time offset as a basis to determine when the media client should carry out the content-related action in the second linear media stream comprises applying the computed time offset as a basis to translate the specified action time point into an associated media-client time point according to the media-client clock.

18. The media client of claim 17, wherein the multiple linear media streams are distributed by a content distribution system, wherein processing the multiple linear media streams for presentation comprises receiving the multiple linear media streams distributed by the content distribution system, and wherein the server clock defines time according to the content distribution system.

19. The media client of claim 17, wherein the operations further comprise:
generating query fingerprints representing the second linear media stream; and
transmitting, to the server, the generated query fingerprints to enable the server to identify the second linear media stream.

20. A non-transitory computer-readable medium embodying program instructions executable by a processing unit to carry out to cause a media client to carry out operations comprising:
processing multiple linear media streams for presentation, the multiple linear media streams including a first linear media stream and a second linear media stream, each media stream of the multiple linear media streams defining a respective time sequence of frames of media content, the first linear media stream being steganographically encoded with a watermark at a time-point within first linear media stream, the watermark encoding a timestamp of the time-point within the first linear media stream according to a server clock;
extracting the timestamp from the watermark, and computing a time offset based on a difference between the extracted timestamp and a current time according to a clock of the media client; and
using the computed time offset as a basis to determine when the media client should carry out a content-related action in the second linear media stream.

* * * * *